US007937747B2

(12) United States Patent
Antoine et al.

(10) Patent No.: US 7,937,747 B2
(45) Date of Patent: May 3, 2011

(54) PRIVACY PROTECTION FOR MOBILE INTERNET PROTOCOL SESSIONS

(75) Inventors: Stephane Antoine, Reading Berkshire (GB); Makis Kasapidis, Markinche Fife (GB)

(73) Assignee: Panasonic Corporation, Osaka (JP)

( * ) Notice: Subject to any disclaimer, the term of this patent is extended or adjusted under 35 U.S.C. 154(b) by 1034 days.

(21) Appl. No.: 11/728,867

(22) Filed: Mar. 27, 2007
(Under 37 CFR 1.47)

(65) Prior Publication Data
US 2008/0244727 A1    Oct. 2, 2008

(51) Int. Cl.
*G06F 15/16* (2006.01)
(52) U.S. Cl. .......................................... 726/3; 709/228
(58) Field of Classification Search ....... 726/3; 709/228
See application file for complete search history.

(56) References Cited

U.S. PATENT DOCUMENTS

| | | | |
|---|---|---|---|
| 7,539,773 B2 * | 5/2009 | Akisada et al. ............... 709/245 |
| 7,623,666 B2 * | 11/2009 | Motoyoshi et al. ........... 380/270 |
| 7,636,569 B2 * | 12/2009 | Le et al. ..................... 455/435.1 |
| 7,697,501 B2 * | 4/2010 | O'Neill ......................... 370/349 |
| 2002/0147820 A1 * | 10/2002 | Yokote .......................... 709/229 |
| 2004/0111483 A1 * | 6/2004 | Watanabe ..................... 709/207 |
| 2004/0148364 A1 | 7/2004 | Kim et al. |
| 2005/0044362 A1 * | 2/2005 | Haddad et al. ................. 713/170 |
| 2005/0101321 A1 * | 5/2005 | Ikeda et al. ................ 455/435.1 |
| 2006/0002344 A1 * | 1/2006 | Ono et al. ...................... 370/331 |
| 2006/0083238 A1 * | 4/2006 | Lee et al. ....................... 370/389 |
| 2006/0129630 A1 * | 6/2006 | Catalina-Gallego et al. . 709/203 |
| 2006/0227971 A1 * | 10/2006 | Haddad ......................... 380/247 |
| 2006/0259969 A1 * | 11/2006 | Suh et al. ......................... 726/23 |
| 2007/0189255 A1 * | 8/2007 | Navali et al. .................. 370/338 |
| 2008/0256220 A1 * | 10/2008 | Bachmann et al. ........... 709/222 |
| 2008/0259848 A1 * | 10/2008 | Aso et al. ...................... 370/328 |

FOREIGN PATENT DOCUMENTS

| | | |
|---|---|---|
| EP | 1 432 198 | 6/2004 |
| EP | 1432198 A1 * | 6/2004 |
| WO | WO 03/030488 A | 4/2003 |
| WO | WO 03030488 A1 * | 4/2003 |

OTHER PUBLICATIONS

Narten T. et al., "RFC 3041: Privacy Extensions for Stateless Address Autonconfiguration in IPv6" IETF Request for Comments, Jan. 1, 2001, pp. 1-17, XP002181525.
International Search Report Aug. 16, 2005.

* cited by examiner

*Primary Examiner* — Michael Pyzocha
(74) *Attorney, Agent, or Firm* — RatnerPrestia

(57) ABSTRACT

A method of establishing communication protocols between a mobile node and a home agent in a mobile communications networks. The method uses the steps of: generating, at the mobile node plural care of addresses (CoAs) and a corresponding number of security parameter indices; sending the generated CoAs and security parameter indices to the home agent in an encrypted form; generating, at the home agent, on the basis of the received CoAs and security parameter indices, an equal number of home addresses (HoAs) and associated security parameter indices; sending the list of HoAs and associated security parameter indices generated at the home agent to the mobile node, and; using the generated CoAs, HoAs and associated security parameter indices as the basis for communication protocol addresses and encryption for communication between the home agent and the mobile node. A system employing the method is also provided.

14 Claims, 1 Drawing Sheet

PRIVACY PROTECTION FOR MOBILE INTERNET PROTOCOL SESSIONS

Figure 1:
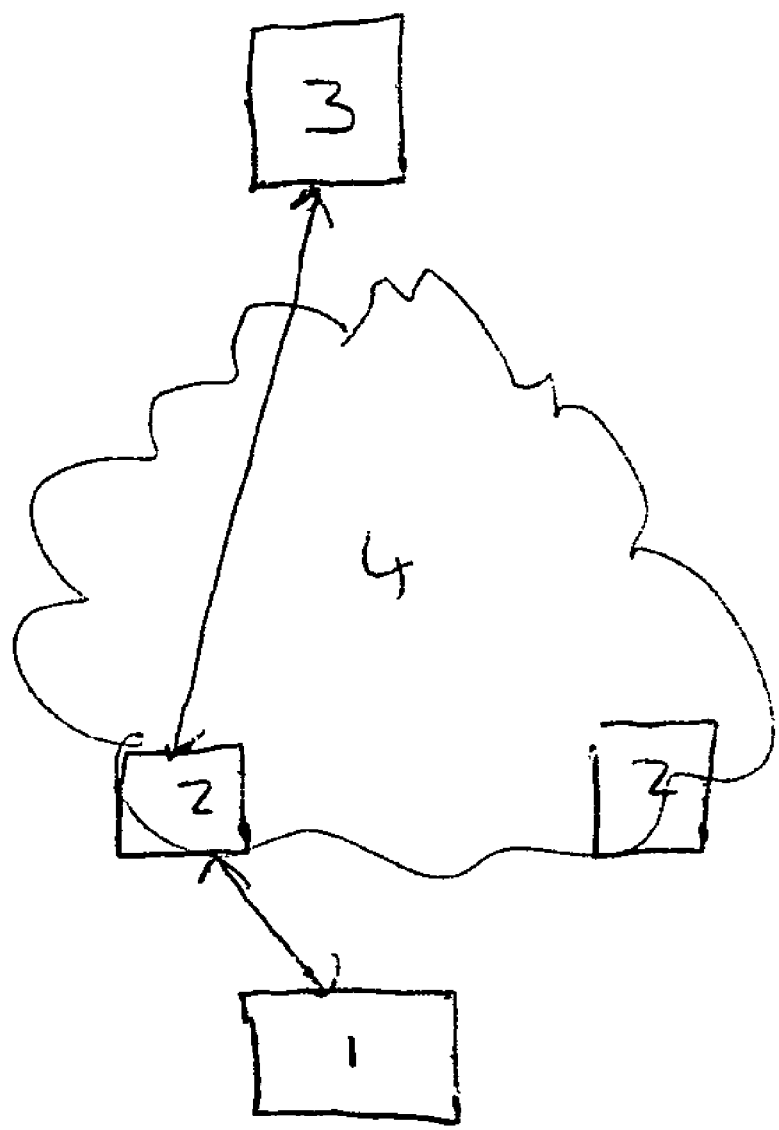

The present invention relates to mobile communications, and particularly to mobile internet communications.

In such communications privacy is a general term to designate the claim of individuals to determine for themselves when, how, and to what extent information about themselves is communicated to others. Such privacy is usually considered to encompass several properties, which are Anonymity, Pseudonimity, unlinkabilty and location privacy.

Anonymimity ensures that a user may use a resource or service without disclosing it.

Pseudonimity ensures that a user may use a resource or service without disclosing its user identity, but still can be accountable for that use.

Unlinkability ensures that a user may make use of resources or services without others being able to link these two uses together.

Location privacy means the capability of a mobile node to conceal the relationship between its location and any personal identifiable information from third parties.

In the latest protocols, such as IPv6, addresses generated using stateless address auto-configuration contain an embedded 64-bit interface identifier, which remains constant over time. This can be a problem for privacy as anytime a fixed identifier is used in multiple contexts, it becomes possible to correlate seemingly unrelated activity using this identifier. Attackers who are present in the path between the communicating peers can view the constant address present in the datagrams and perform this correlation. To solve this problem and provide unlinkability, a privacy extension for IPv6 has been proposed. Such privacy extension for stateless address auto-configuration allows IPv6 addresses to have their interface ID change randomly at periodic intervals of time. A temporary address whose interface ID changes periodically makes it more difficult for indiscrete information collectors in the Internet domain to correlate when different transactions actually correspond to the same node/user.

Mobile Ipv6 utilizes a node with an address that does not change as the home agent. Whenever the mobile node moves to a new subnet and acquires a new IP address, called a care of address (CoA), it notifies the home agent of the new address. Packets addressed to the unchanged home agent are tunnelled by the home agent to the latest CoA being used by the mobile node. The notification of the home agent is called a binding update. The binding update contains a Constant Home Address (HoA), to which the mobile node is always addressable. A Binding Acknowledgement (BACK) is sent in response to the binding update and contains the same HoA in its routing header.

As IPsec protects the binding update and the BACK between the mobile node and its home access, a constant Security Parameter Index (SPI) identifying each one-way security association is apparent in the binding update and the BACK.

Accordingly, the latest protocols sessions, such as Mobile IPv6 sessions do not benefit from the address change offered by privacy extension in other protocols because the constant home address present in its Mobility option, together with the security parameter index, allows correlation of sessions even when the Care of Address (CoA) changes.

According to the present invention there is provided a method of establishing communication protocols between a mobile node and a home agent in a mobile communications networks, the method comprising the steps of:

generating, at the mobile node plural care of addresses (CoAs) and a corresponding number of security parameter indices;

sending the generated CoAs and security parameter indices to the home agent in an encypted form;

generating, at the home agent, on the basis of the received CoAs and security parameter indices an equal number of home addresses (HoAs) and security parameter indices;

sending the list of HoAs and security parameter indices generated at the home agent to the mobile node, and;

using the generated CoAs, HoAs and security parameter indices as the basis for communication protocol addresses and encryption for communication between the home agent and the mobile node.

The present invention also provides a system arranged to employ the above method.

The present invention addresses the problem of linkability in relation to protocols such as Mobile Ipv6. Currently a third party that can intercept packets between the mobile node and the home agent can correlate the various sessions of a given user.

In the present invention, a mobile node and its home access point agree beforehand on the use of a number of sets of CoA, HoA, and Security Parameter Indices which are used for every new session. Each IP address should be unique and a check for such uniqueness can only be run at the local link where the address will be used. Also, although the Security Parameter Index is written in a packet by the sending node it must be unique for all the sessions at the receiving node so Security Parameter Indices must be generated by the receiving node and communicated to the sending node.

One example of the present invention will now be described with reference to the accompanying drawing, in which figure one is a schematic diagram showing a system according to the present invention.

Referring to FIG. 1, a system according to the present invention comprises a mobile node 1 which can connect, dependent upon its location, with one of a number of local subnets 2 to communicate with a home agent 3 via a network 4 such as the Internet. The mobile node 1 may be any one of a number of mobile communication devices, such as a portable or handheld computer or mobile telephone.

The invention employs a method which comprises the following steps. Firstly, the mobile node 1 generates a number of care of addresses (CoAs) upon arrival at the new subnet 2. For each address selected, duplicate address detection is performed on the subnet network. The mobile node 1 also generates an equal number of Security Parameter Indices.

The list of CoAs and corresponding Security Parameter Indices is sent to the home agent 3 encrypted as an option in the binding update message that must be sent every time the mobile node 1 moves to a new subnet 2.

The home agent 3, upon receipt of the binding update, generates a number of HoAs and performs duplicate address detection for each one of them. The home agent 3 also generates an equal number of Security Parameter Indices.

The list of HoAs and Security Parameter Indices is sent to the mobile node 1 encrypted in the BACK message as options.

The security selectors at the mobile node 1 and the home agent 3 are then updated so that packets corresponding to all pairs (CoA-HoA) for a given mobile node 1 use the same security association and communication can commence.

Then, when the mobile node 1 initiates a new session, it uses the next unused pair of CoA-HoA addresses and corresponding Security Parameter Index. Each pair of (CoA-HoA) is only used once per transaction.

Similarly, for a new session initiated by a correspondent node that uses the home agent 3 to contact the mobile node 1, the home agent 3 will use a new set of CoA-HoA to tunnel the packets to the mobile node 1.

With the above method the home agent 3 can be configured also to be monitoring for the next pair of CoA-HoA on its connections so that any change can be effected without undue delay.

As will be appreciated from the above, the present invention enables the provision, even with mobile protocols, of unlinkable privacy communication without the need for high levels of data communication between the mobile node 1 and home agent 3.

The invention claimed is:

1. A method of establishing communication protocols between a mobile node and a home agent in a mobile communications network, the method comprising the steps of:
generating, at the mobile node, plural care of addresses (CoAs) and a corresponding number of security parameter indices;
sending the generated CoAs and security parameter indices to the home agent in an encrypted form;
generating, at the home agent, on the basis of the received CoAs and security parameter indices, an equal number of home addresses (HoAs) and associated security parameter indices;
sending the HoAs and associated security parameter indices generated at the home agent to the mobile node; and
using the generated CoAs, HoAs in pairs along with the associated security parameter indices as the basis for communication protocol addresses and encryption for communication between the home agent and the mobile node.

2. A method according to claim 1, wherein the step of sending the generated CoAs and security parameter indices to the home agent is carried out as part of a binding update message as the mobile node begins communication via a new subnet node.

3. A method according to claim 2, wherein the HoAs and security parameter indices generated at the home agent are sent to the mobile node as part of a binding acknowledgment (BACK) signal.

4. A method according to claim 1, wherein the CoA addresses are checked for their uniqueness with a duplicate address detection procedure.

5. A method according to claim 1, further comprising the step of monitoring, at the home agent, for the next HoA-CoA pair in an agreed list.

6. A method according to claim 1, wherein the method conforms to the Mobile IPv6 protocol.

7. A non-transitory computer-readable medium having stored on it instructions to operate a computer system to perform the method of claim 1.

8. A method according to claim 1, wherein one of the CoA-HoA pairs and corresponding security parameter index are used for every new communication session between the mobile node and the home agent.

9. A mobile communication system for connecting, via a network, between a mobile node, a home agent and at least one subnet node, the system comprising:
a mobile node configured to generate plural CoAs and a corresponding number of security parameter indices, and to send the generated CoAs and security parameter indices to a home agent; and
a home agent configured to generate, on the basis of the received CoAs and security parameter indices from the mobile node, a corresponding number of home addresses (HoAs) and associated security parameter indices, and to send the HoAs and associated security parameters indices to the mobile node,
wherein the mobile node and home agent are arranged to communicate on the basis of protocols employing the generated CoAs and HoAs in pairs along with the associated security parameter indices.

10. The mobile communication system according to claim 9, wherein one of the CoA-HoA pairs and corresponding security parameter index are used for every new communication session between the mobile node and the home agent.

11. A home agent for connecting, via a network, to a mobile node and at least one subnet node in a mobile communication system, the home agent configured to:
receive, from a mobile node, plural care of addresses (CoAs) and a corresponding number of security parameter indices;
generate, on the basis of the received CoAs and security parameter indices, a corresponding number of home addresses (HoAs) and associated security parameter indices; and
send the HoAs and associated security parameter indices to the mobile node,
wherein the home agent is arranged to communicate with the mobile node on the basis of protocols employing the generated CoAs and HoAs in pairs along with the associated security parameter indices.

12. A home agent according to claim 11, wherein one of the CoA-HoA pairs and corresponding security parameter index are used for every new communication session between the mobile node and the home agent.

13. A mobile node for connecting, via a network, to a home agent in a mobile communication system, the mobile node configured to:
generate plural care of addresses (CoAs) and a corresponding number of security parameter indices;
send the generated care of addresses (CoAs) and corresponding security parameter indices to the home agent;
receive a corresponding number of home addresses (HoAs) and associated security parameter indices, which are generated by and sent from the home agent on the basis of the received CoAs and security parameter indices; and
select a CoA and a paired HoA along with an associated security parameter index,
wherein the mobile node is arranged to communicate with the home agent on the basis of protocols employing the generated CoAs and HoAs in pairs along with the associated security parameter indices.

14. A mobile node according to claim 13, wherein the mobile node uses one of the CoA-HoA pairs and corresponding security parameter index for each new communication session between the mobile node and the home agent.

* * * * *